(12) United States Patent
Zhu et al.

(10) Patent No.: US 8,534,514 B2
(45) Date of Patent: Sep. 17, 2013

(54) HOLDER FOR ELECTRONIC DEVICE

(75) Inventors: Tai-Shan Zhu, Shenzhen (CN); Che-Yu Chou, New Taipei (TW); Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 181 days.

(21) Appl. No.: 13/171,682

(22) Filed: Jun. 29, 2011

(65) Prior Publication Data

US 2012/0211626 A1 Aug. 23, 2012

(30) Foreign Application Priority Data

Feb. 22, 2011 (CN) .......................... 2011 1 0042394

(51) Int. Cl.
*A44C 5/00* (2006.01)
(52) U.S. Cl.
USPC ........... 224/165; 224/152; 224/219; 224/267; 248/114
(58) Field of Classification Search
USPC .............. 248/690, 114, 228.8; 224/101, 152, 224/576, 163, 165, 191, 219, 267
See application file for complete search history.

(56) References Cited

U.S. PATENT DOCUMENTS

| | | | | |
|---|---|---|---|---|
| 2,352,473 | A * | 6/1944 | Cortese | 224/221 |
| 2,465,946 | A * | 3/1949 | Velez | 132/315 |
| 4,785,981 | A * | 11/1988 | Rodman | 224/165 |
| 5,008,864 | A * | 4/1991 | Yoshitake | 368/10 |
| 5,274,613 | A * | 12/1993 | Seager | 368/13 |
| 5,636,775 | A * | 6/1997 | Kartsotis et al. | 224/165 |
| 6,212,414 | B1 * | 4/2001 | Alameh et al. | 455/575.6 |
| 6,285,757 | B1 * | 9/2001 | Carroll et al. | 345/619 |
| 8,056,780 | B1 * | 11/2011 | Bruns | 224/163 |
| 8,345,412 | B2 * | 1/2013 | Maravilla et al. | 361/679.03 |
| 2001/0004397 | A1 * | 6/2001 | Kita et al. | 381/334 |
| 2003/0222109 | A1 * | 12/2003 | Weiss | 224/222 |
| 2004/0057578 | A1 * | 3/2004 | Brewer | 379/433.1 |
| 2006/0261107 | A1 * | 11/2006 | Daniels | 224/219 |
| 2011/0108589 | A1 * | 5/2011 | Kim | 224/222 |
| 2012/0168471 | A1 * | 7/2012 | Wilson | 224/152 |
| 2012/0211626 | A1 * | 8/2012 | Zhu et al. | 248/316.1 |
| 2013/0001263 | A1 * | 1/2013 | Kai | 224/219 |

* cited by examiner

*Primary Examiner* — Bradley Duckworth
(74) *Attorney, Agent, or Firm* — Altis Law Group, Inc.

(57) ABSTRACT

A holder for holding an electronic device on a wrist includes a band which can be connected around the wrist and a case connected to the band for holding the electronic device securely. The case includes a first receptacle and at least one second receptacle. The first receptacle is used for securing the electronic device to the holder. The at least one second receptacle receives at least one accessory of the electronic device.

20 Claims, 5 Drawing Sheets

HOLDER FOR ELECTRONIC DEVICE

BACKGROUND

1. Technical Field

The present disclosure relates to holders for holding electronic devices, and more particularly, to a holder with a wrist band or arm band.

2. Description of Related Art

To carry around hand held electronic devices, users usually use a belt clip, their handbags or sometimes, users tie the electronic devices to straps and then hang the straps around their necks. However, the device can snag when on the strap or belt or hard to get at quickly in a handbag which is inconvenient to users.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
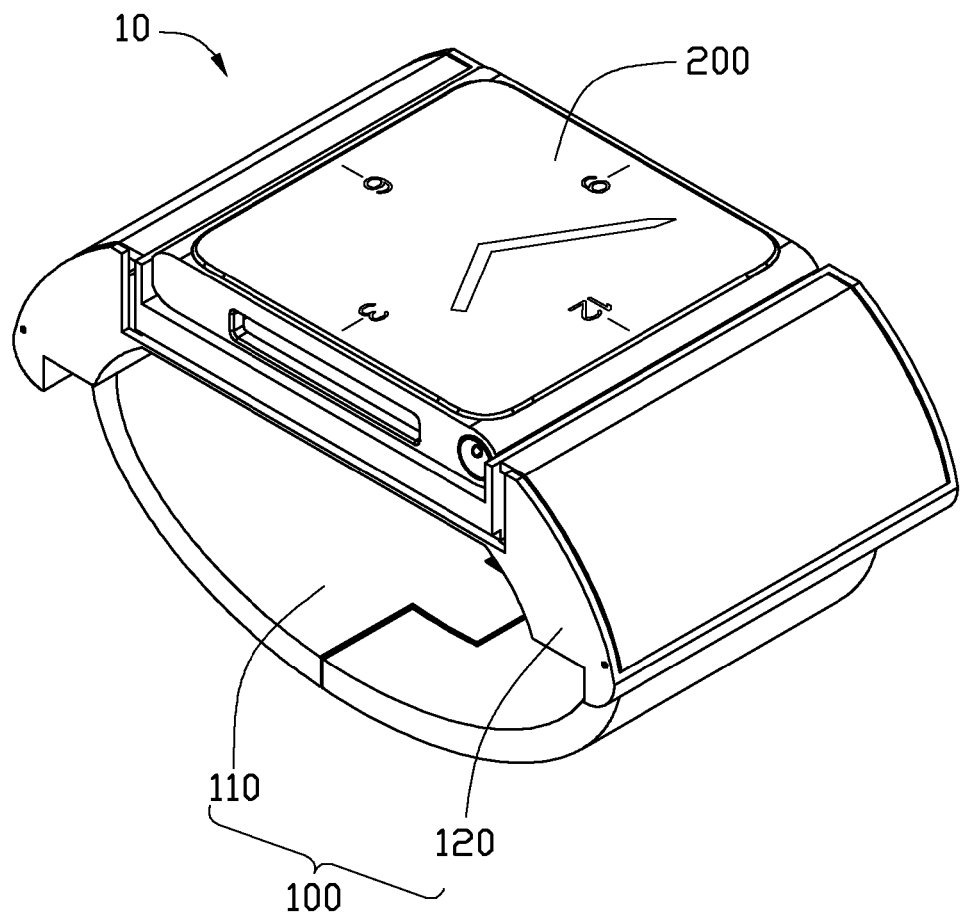
FIG. 1 is a schematic view of a holder engaging with an electronic device according to an embodiment of the present disclosure. The holder includes two covers, which are closed.

Referring to FIG. 1, an electronic apparatus 10 including a holder 100 and an electronic device 200 mounted to the holder 100 is shown. In an embodiment, the electronic device 200 may be a handheld electronic device for example a mini music player such as IPOD nano. Also, the electronic device 200 may function as a watch with a display for showing the time. The electronic device 200 may include an accessory 220 (see FIG. 5) such as a set of earphones which can be connected to the electronic device 200. In the illustrated embodiment, the holder 100 is a wristband for securing the electronic device 200 and the accessory 220 thereof on a user's wrist. The holder 100 includes a band 110 and a case 120 connected to the band 110. The band 110 is made of elastic material. In some embodiments, the case 120 is configured to receive the electronic device 200 and to receive the accessory 220 at the same time.

Figure 2:
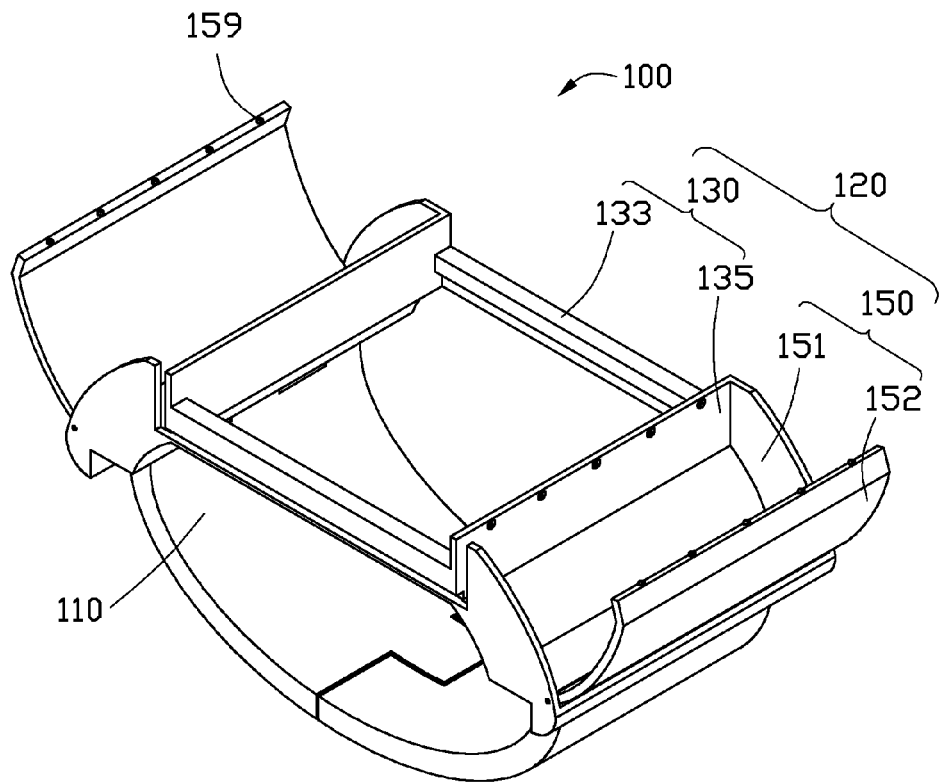
FIG. 2 is a schematic view of the holder of FIG. 1 with the covers in an open state.
Figure 3:
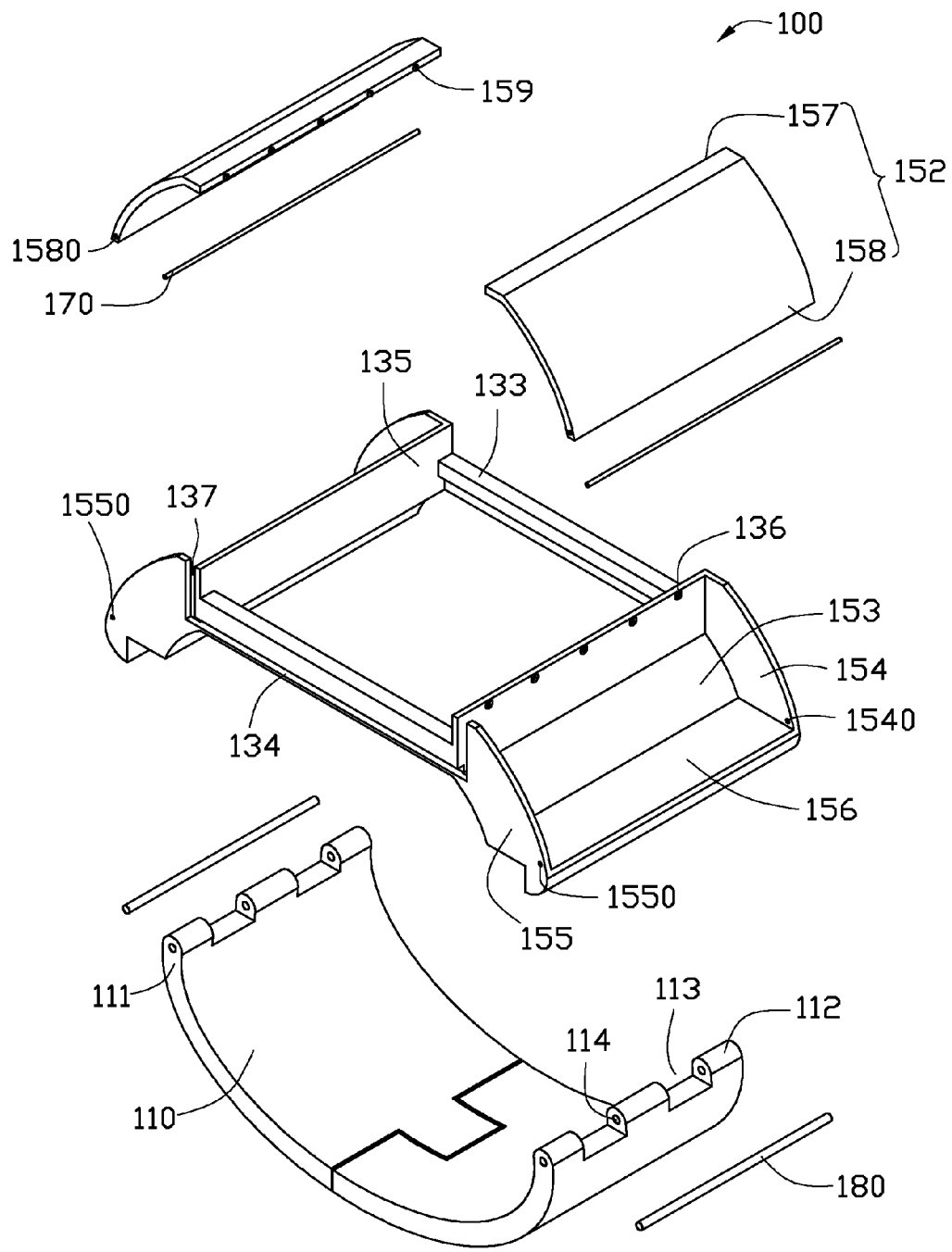
FIG. 3 is an exploded view of the holder of FIG. 1.

Referring to FIGS. 2-3, the band 110 has two opposite end portions 111. Each end portion 111 is recessed to form three first protrusions 112 and two depressions 113 each of which are respectively defined between every two adjacent two first protrusions 112. A first through hole 114 is defined in each first protrusion 112.

The two opposite sides of the case 120 are respectively connected to the two end portions 111 of the band 110. The case 120 includes a first receptacle 130 and two second receptacles 150 respectively disposed on opposite sides of the first receptacle 130, and an extending portion 134. The first receptacle 130 includes two transverse supporting beams 133 opposite each other and two opposite clamping plates 135 respectively connected to the supporting beams 133. The extending portion 134 protrudes out from one supporting beam 133 along a direction opposite to the other supporting beam 133. A plurality of slots 136 are defined at the top of each clamping plate 135.

The second receptacles 150 are adjacent to the first receptacle 130. Each second receptacle 150 includes a receiving portion 151 and a cover 152 for covering the receiving portion 151. Each receiving portion 151 includes a first side wall 153, a second side wall 154, and third side wall 155, and a fourth side wall 156. The first side wall 153 is connected to the bottom of the corresponding clamping plate 135. The second side wall 154 protrudes outwards from the first side wall 153 and is supported by the corresponding clamping plate 135. The third side wall 155 also protrudes outwards and upwards from the first side wall 153 and opposes the second side wall 154. The third side wall 155 is spaced a significant distance away from the corresponding clamping plate 135 leaving a space 137 and is connected to the extending portion 134 through the space 137. The fourth side wall 156 is connected to both the second and third side walls 154, 155 and is opposite to the corresponding clamping plate 135. A second through hole 1540 and a third through hole 1550 aligning with each other are respectively defined in the second and the third side walls 154, 155.

The covers 152 are substantially arc shaped and pivotally connected so as to cover and uncover the receiving portions 151. Each cover 152 includes a first side portion 157 and a second side portion 158 opposite to the first side portion 157. A plurality of blocks 159 protrude from the first side portion 157 of each cover 152 and correspond to the plurality of slots 136 defined in each clamping plate 135. A fifth through hole 1580 is defined in the base of each second side portion 158.

Referring to FIG. 3 again, the case 120 further includes two first dowel pins 170 and two second dowel pins 180. Each first dowel pin 170 corresponds to the second through hole 1540 and the third through hole 1550 defined in each receiving portion 152, and the fifth through hole 1580 defined in each cover 152. The length of each first dowel pin 170 is equal to the distance between the second side wall 154 and the third side wall 155. Each second dowel pin 180 corresponds to the first through hole 114 defined in each end portion 111 and the fourth through hole 161 defined in each second protrusion 160 as shown in FIG. 4 with an length thereof equal to the width of the band 110.

The case 120 further includes four protrusions 160 each two of which protruding from an outer surface of the fourth side wall 156 of each receiving portion 151 and evenly spaced from each other. A fourth through hole 161 is defined in each second protrusion 160 and corresponds to the first through hole 114.

The assembly process will be described in detail in the following which only describes the assembly of one single component as an example since the components are disposed in the same way.

Figure 4:
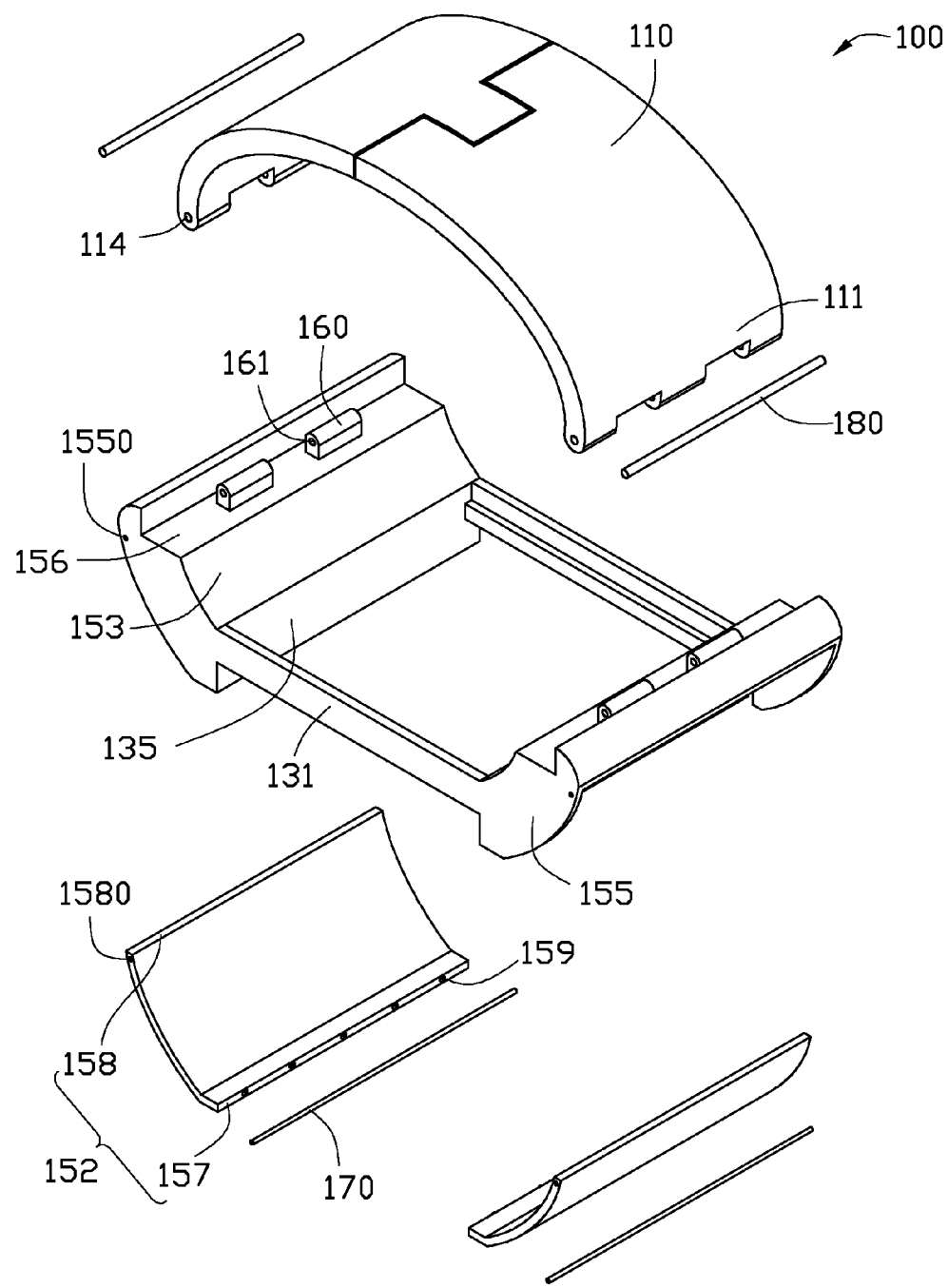
FIG. 4 is similar to FIG. 3 but from a reverse angle.

Referring to both FIGS. 3 and 4, in assembly, when the cover 152 is connected to the receiving portion 151, the second side portion 158 thereof contacts the interior surface of the fourth side wall 156 of the receiving portion 151, and the fourth through hole 1580 corresponds to the second and third through holes 1540 and 1550 respectively. The first dowel pin 170 is inserted in the second, third and forth through holes 1540, 1550, and 1580 to pass through the second side wall 154, the third side wall 155, and the second side portion 158 of the cover 152 to form a first connection structure to pivotally connect the cover 152 and the receiving portion 151. The blocks 159 protruding from each cover 152 are received in the slots 136 with elastic deformation of the cover 152 and/or the clamping plate 135, thereby keeping the cover 152 is a closed state.

When the case 120 is connected to the band 110, the two second protrusions 160 protruding from the fourth side wall 156 of the receiving portion 151 is received in the depressions 113 defined in the end portion 111 of the band 110. The first through hole 114 corresponds to the fifth through hole 161. The second dowel pin 180 is inserted in the first through hole 114 and the fifth through hole 161 to pass through the second protrusions 160 and the first protrusions 112 to form a second connection structure to connect the case 120 to the band 110.

Figure 5:
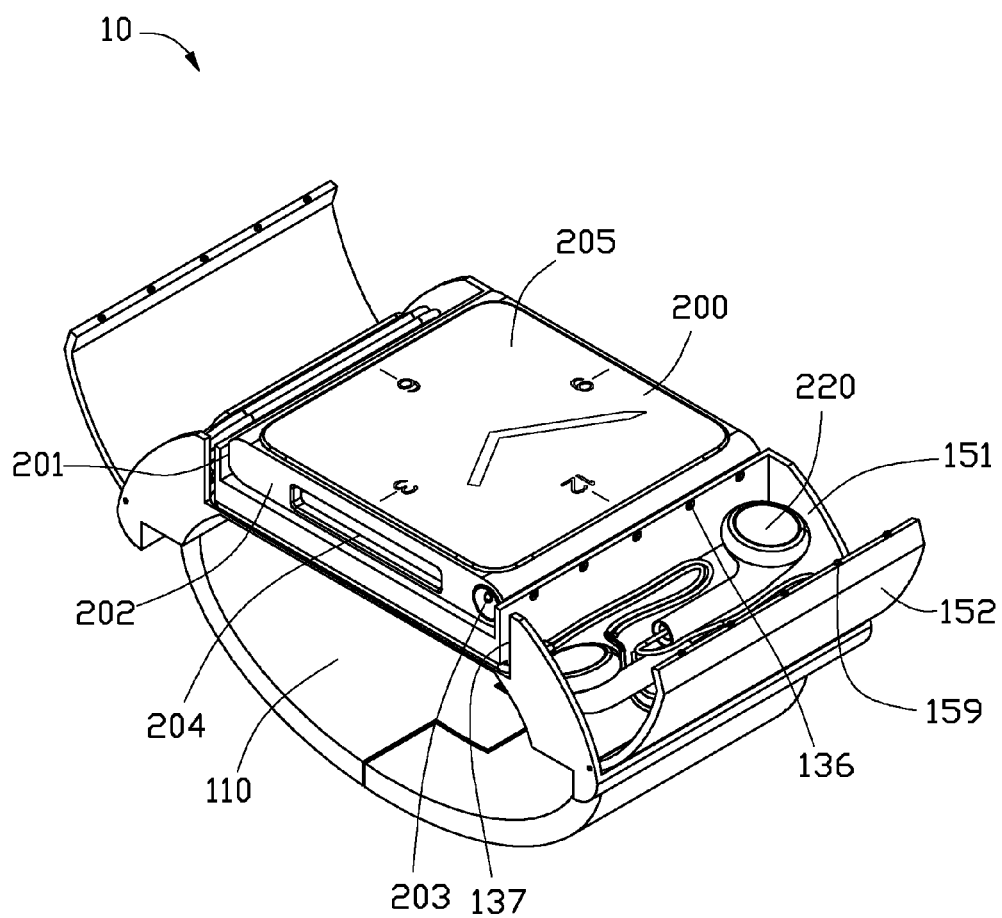
FIG. 5 is similar to FIG. 1 with the covers in an open state.

Referring to FIG. 5, when the electronic device 200 is attached to the holder 110, the electronic device 200 is held in place by the clamping plates 135 and supported by the supporting beams 133. At this time, two opposite first sides 201 of the electronic device 200 are respectively covered by the clamping plates 135, and an earphone jack 203 thereof and a dock connector 204 thereof arranged in two opposite second sides 202 of the electronic device 200 remains fully accessible. Also, a display 205 of the electronic device 200 is accessible to users so that users can operate or watch the display as the electronic device 200 is secured to the holder 100.

In this situation, the accessory 220 of the electronic device 200 can be accommodated in one second receptacle 150. And the other second receptacle 150 can be used for accommodating any other accessories such as a data line or a battery. Also, users can use the two second receptacles 150 to receive one accessory of the electronic device. For example, a first part of the accessory 220, for example, two receivers of a set of earphones of the electronic device 200 can be accommodated in one second receptacle 150. The wires connected to the receivers protrude out of the second receptacle 150 through the space 137. The existence of space 137 allows the storage in the receptacle 150 of devices with wire connections, whereby one end of the wire plus device (for example the two earphones) can be kept in one of the receptacles 150, and the other end of the wire plus device (for example the connection plug or jack plug) can be kept in the other receptacle 150.

It should be understood that the accessory 220 of the electronic device 200 is not limited in this embodiment. In other embodiments, the accessory 220 may be an electrical charger or a data line. Also, the accessory 220 can be just received in one receiving portion 151.

The case 120 in the embodiment allows users to carry and use the electronic device 200 conveniently. Only the holder 100 needs to be worn by the user, the electronic device 200 need not be held in the hand. When users wish to use the electronic device 200, they can just open the covers 152 to take out the accessory 220 while the electronic device 200 is operating, securely attached to the case 120.

It is to be understood, however, that even though information and the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A holder for holding an electronic device, comprising:
a band comprising two opposite end portions; and
a case connected to the end portions of the band, the case comprising:
a first receptacle for receiving the electronic device; and
at least one second receptacle connected to the first receptacle for receiving at least one accessory of the electronic device;
wherein a space is defined between a side of the first receptacle and a side of the at least one second receptacle for allowing a part of the accessory received in the at least one second receptacle to pass therethrough.

2. The holder as claimed in claim 1, wherein each second receptacle comprises a receiving portion and a cover pivotally connected to the receiving portion for covering the receiving portion.

3. The holder as claimed in claim 2, wherein at least one slot is defined in the first receptacle, and at least one block protrudes from the cover for being received in the at least one slot for keeping the cover in a close state.

4. The holder as claimed in claim 3, wherein the first receptacle comprises two opposite supporting beams for supporting the electronic device and two opposite clamping plates respectively connected to the supporting beams for securing the electronic device.

5. The holder as claimed in claim 4, wherein the at least one slot is defined in the clamping plate.

6. The holder as claimed in claim 4, wherein the first receptacle further comprises an extending portion protruding from one supporting beam into the at least one second receptacle through the space.

7. The holder as claimed in claim 6, wherein the receiving portion comprises two opposite side walls located at two opposite sides of the clamping plate, the space is defined between one side wall and the clamping plate, the holder further comprises a first connection structure for connecting the cover to the receiving portion, the first connection structure comprises a first dowel pin passing through the two side walls and the cover.

8. The holder as claimed in claim 2, wherein the holder further comprises a second connection structure for connecting the case to the band, the second connection structure comprises at least one protrusion protruding from the case and a second dowel pin passing through the at least one first protrusion and the band.

9. The holder as claimed in claim 8, wherein each end portion of the band is recessed to define at least one depression for receiving the at least one protrusion, the at least one protrusion protrudes from each receiving portion, and the second dowel pin passes through the at least one depression and the at least one second protrusion.

10. A holder for a user to wear an electronic device, the holder comprising:
a band with two end portions; and
a case detachably connected to the end portions of the band for receiving the electronic device thereon and receiving at least one accessory of the electronic device, the case comprising:
a first receptacle for receiving the electronic device; and
two second receptacles connected at two opposite sides of the first receptacle for receiving at least one accessory of the electronic device;
wherein a space is defined between a side of the first receptacle and a side of each second receptacles for allowing a part of the accessory received in each second receptacle to pass therethrough.

11. The holder as claimed in claim 10, wherein the first receptacle comprises two opposite supporting beams for supporting the electronic device, and two opposite clamping plates respectively connected to the supporting beams for clamping the electronic device.

12. The holder as claimed in claim 11, wherein the two second receptacles are respectively connected to the clamping plates.

13. The holder as claimed in claim 12, wherein each second receptacle comprises a receiving portion and a cover pivotally connected to the receiving portion for covering the receiving portion.

14. The holder as claimed in claim 13, wherein the holder further comprises two first dowel pins each of which passes through the receiving portion and the cover of a corresponding second receptacle for pivotally connecting the cover to the corresponding receiving portion.

15. The holder as claimed in claim 13, wherein the holder further comprises two second dowel pins each of which passes through the end portions and the corresponding receiving portion for hingably connecting the case to the band.

16. The holder as claimed in claim 13, wherein at least one slot is defined in each clamping plate, at least one block protruding from the cover, and the at least one block is received in the at least one slot for keeping the cover in a closed state.

17. The holder as claimed in claim 13, wherein the receiving portion comprises two opposite side walls located at two opposite sides of each clamping plate, and the space is defined between one side wall and the corresponding plate.

18. The holder as claimed in claim 17, wherein the case further comprises an extending portion protruding from one side of one supporting beam which is away from the other supporting beam, and the extending portion extends into the receiving portion of each second receptacle through the space.

19. The holder as claimed in claim 18, wherein the holder is a wrist band for holding the electronic device on a wrist.

20. A holder for holding an electronic device, comprising:
a band comprising two opposite end portions; and
a case connected to the end portions of the band, the case comprising:
  a first receptacle for receiving the electronic device, comprising two opposite supporting beams for supporting the electronic device and two opposite clamping plates respectively connected to the supporting beams for securing the electronic device, at least one slot being defined in one of the clamping plates; and
  at least one second receptacle connected to the first receptacle for receiving at least one accessory of the electronic device, each second receptacle comprising a receiving portion and a cover pivotally connected to the receiving portion for covering the receiving portion, the cover comprising at least one block received in the at least one slot for keeping the cover in a closed state;
wherein a space is defined between the first receptacle and the at least one second receptacle for allowing a part of the accessory received in the at least one second receptacle to pass therethrough.

\* \* \* \* \*